Oct. 22, 1940.   V. N. ALBERTSON ET AL   2,218,510
TRACTOR
Filed July 1, 1938   4 Sheets-Sheet 1
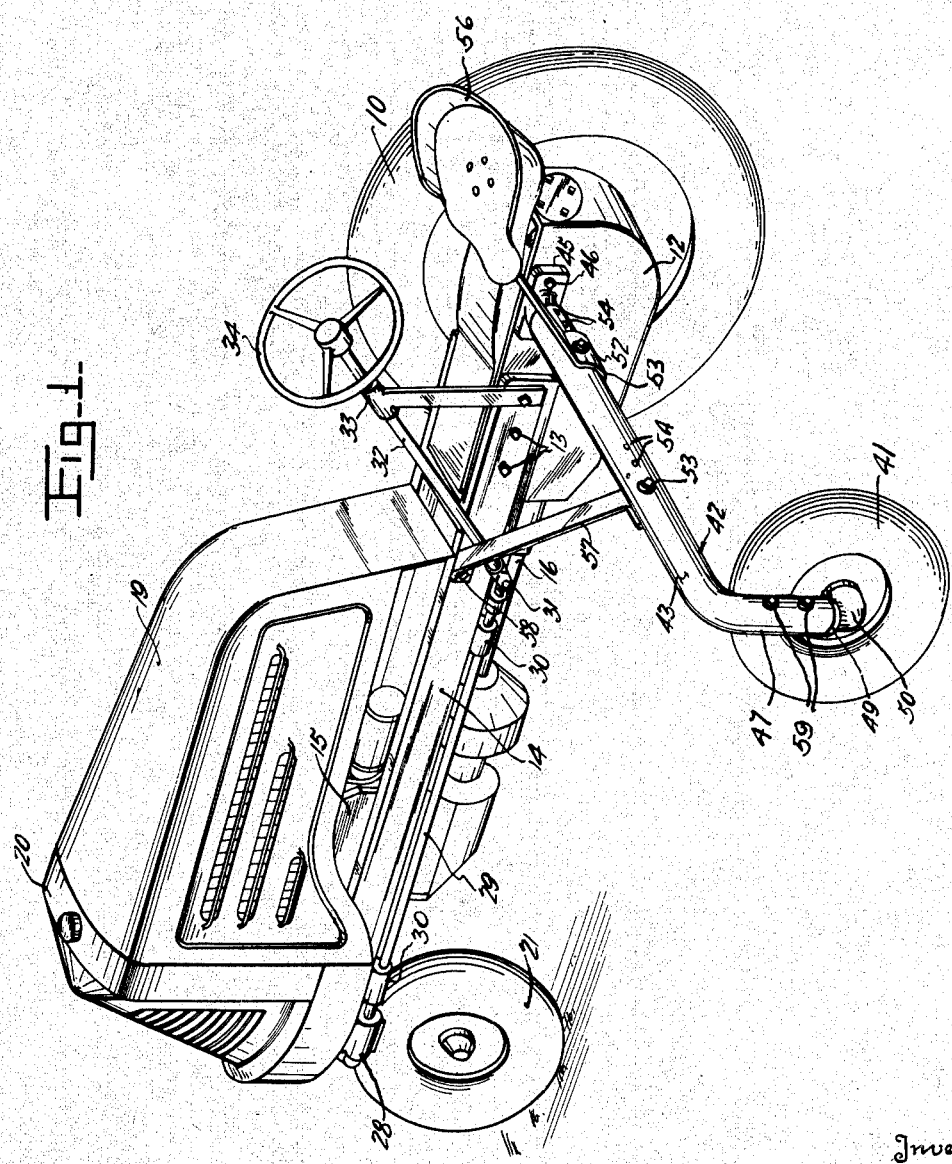
Inventors
JOHN HENNINGSEN
VICTOR N. ALBERTSON
By Andrew E. Carlsen
Attorney

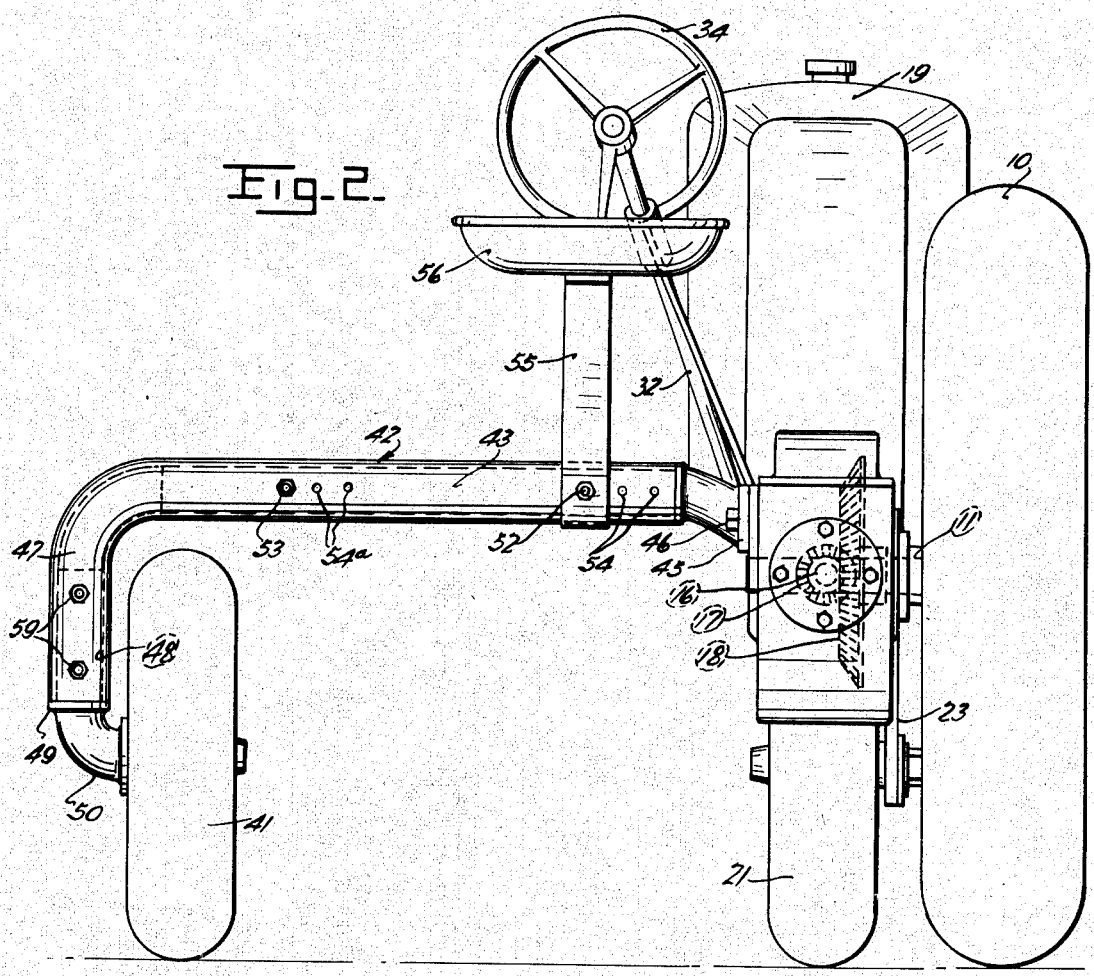
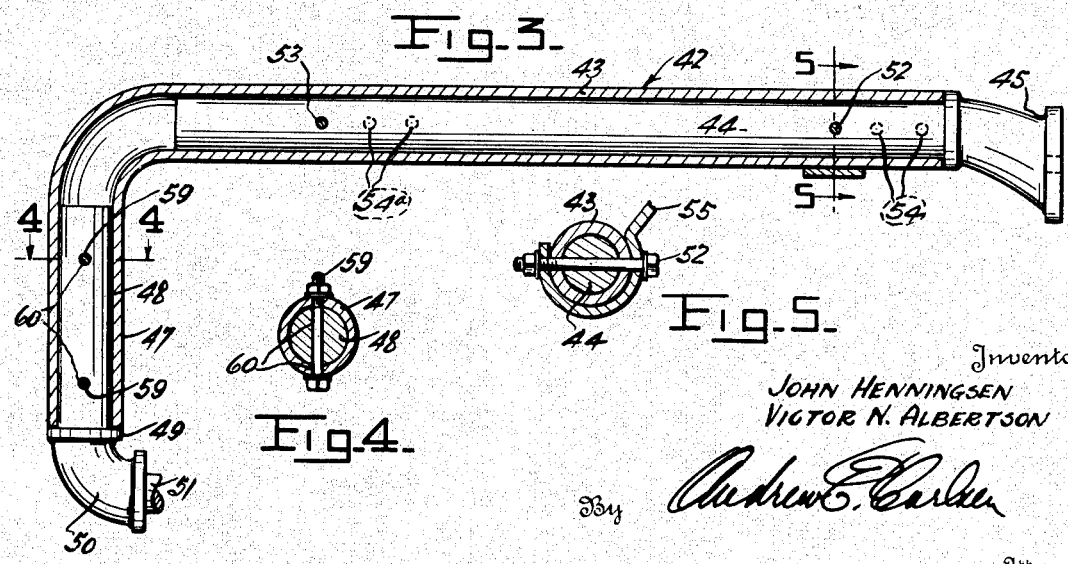

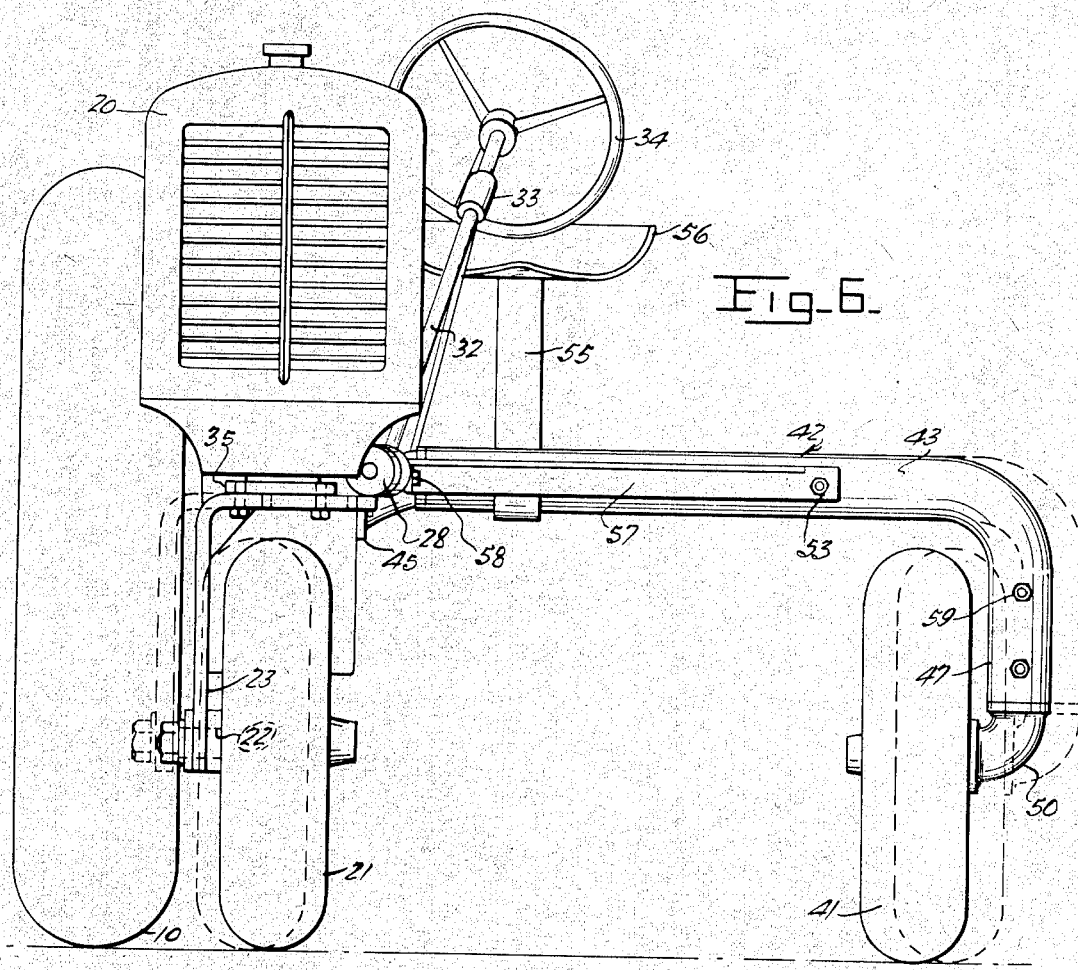
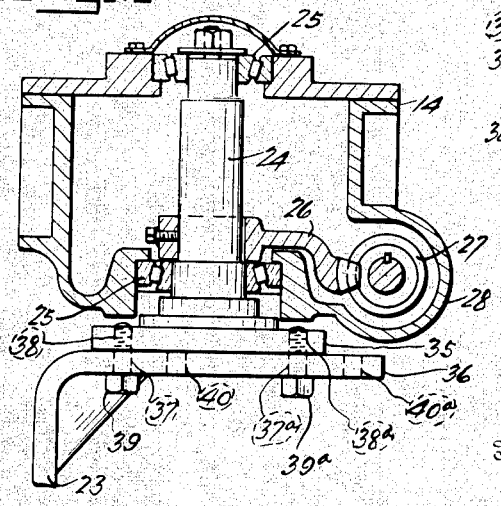

Oct. 22, 1940.   V. N. ALBERTSON ET AL   2,218,510
TRACTOR
Filed July 1, 1938    4 Sheets-Sheet 4
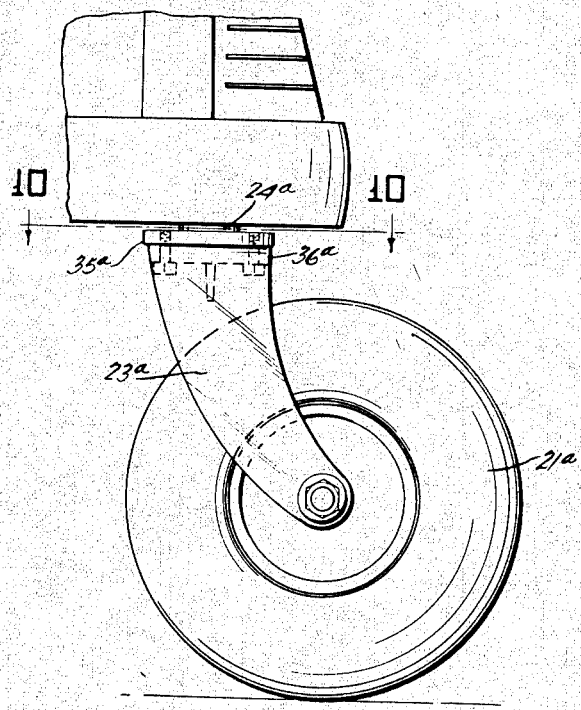
Fig. 9.
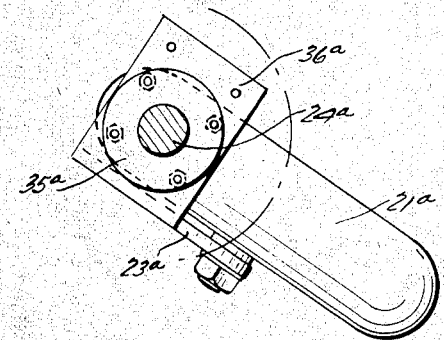
Fig. 10.
Fig. 11.
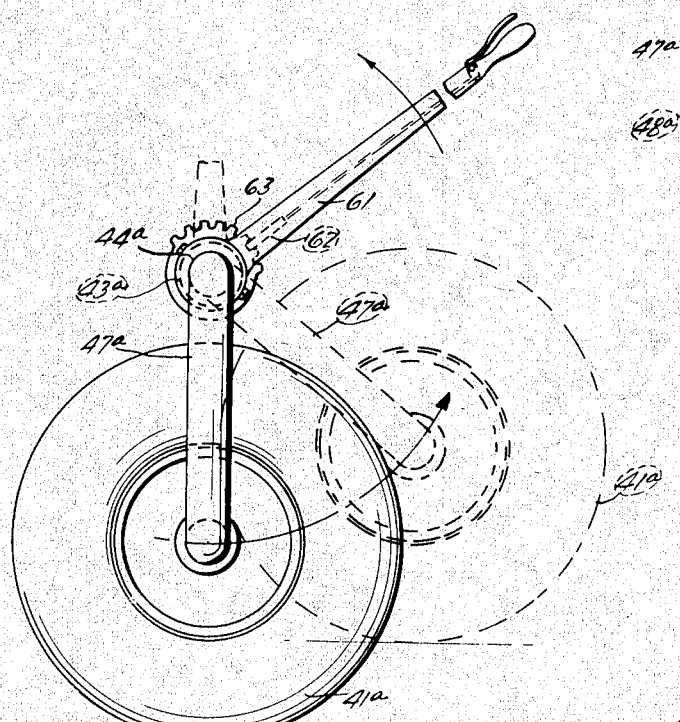
Fig. 12.
Inventors
JOHN HENNINGSEN
VICTOR N. ALBERTSON
Andrew E. Charles
Attorney Patented Oct. 22, 1940

2,218,510

UNITED STATES PATENT OFFICE 2,218,510

TRACTOR

Victor N. Albertson, St. Louis Park, and John Henningsen, Minneapolis, Minn., assignors to Minneapolis-Moline Power Implement Company, Minneapolis, Minn., a corporation of Delaware Application July 1, 1938, Serial No. 216,986

3 Claims. (Cl. 180—25)

This invention relates to improvements in tractors, and the primary object of the invention is to provide a tractor of exceedingly simple and inexpensive construction employing only a single traction wheel and a pair of supporting wheels, and which supporting wheels are arranged for lateral adjustment with respect to the line of travel in order to accommodate the tractor to various uses. Another object is to provide a tractor in which the drive connection may be made to the ground or traction wheel without requiring differential gears, thus greatly simplifying the construction without in any way interfering with the effective operation and maneuverability of the tractor. A further object is to provide a tractor employing a frontal dirigible wheel, a rear traction wheel, and a laterally positioned support wheel carried by an adjustable outrigger or boom from the main tractor frame in such manner that adjustments of the lateral spacing between the supporting and traction wheels may be made as required.

A further object is to provide a tractor of this kind in which provision is also made for lateral adjustments of the dirigible front wheel to thus further adjust the relative paths traveled by the wheels over the ground or fields.

Still a further object is to provide a tractor as described including a laterally spaced supporting or side wheel and with means for adjusting the height at which this wheel is supported. As a result this wheel may be raised when running on the uphill side during side hill plowing operations (and vice versa), to thus maintain the transverse equilibrium of the tractor.

These and other more detailed and specific objects will be disclosed in the course of the following specification, reference being had to the accompanying drawings, in which—

Fig. 1 is a perspective view of the tractor embodying this invention.

Fig. 2 is an enlarged rear end view of the tractor.

Fig. 3 is a further enlarged detail view of the outrigger or boom for the supporting wheel, showing the tubular member thereof in section to better disclose interiorly arranged parts.

Fig. 4 is a cross section along the line 4—4 in Fig. 3.

Fig. 5 is a cross section along the line 5—5 in Fig. 3.

Fig. 6 is a front end view of the tractor, on the same scale as Fig. 2, and also indicating in dotted lines possible adjusted positions of the front wheel and lateral supporting wheel.

Fig. 7 is an enlarged vertical cross section through the frontal end of the tractor frame showing the steering connections to the front wheel.

Fig. 8 is a plan view of the steering worm and gear, the mounting plate and front wheel supporting foot, showing the vertically axised steering shaft in horizontal cross section.

Fig. 9 is a fragmentary, right hand side elevation of the frontal end of the tractor, showing a modified arrangement of a dirigible front wheel mounted on a forwardly and downwardly arcuated bracket for convenience in steering.

Fig. 10 is a horizontal section along the line 10—10 in Fig. 9, and showing the front wheel as adjusted to make a turn to the right.

Fig. 11 is a fragmentary rear elevation of the outer end of the side wheel outrigger and the wheel carried thereby, this view showing a modified outrigger assembly and means for adjusting the height at which the side wheel is carried.

Fig. 12 is a side elevation of the assembly shown in Fig. 11, and also illustrating the wheel in dotted lines in an elevated condition for lowering that side of the tractor.

Referring now more particularly and by reference characters to the drawings, 10 designates a traction wheel which is journaled by its axle 11 in a gear box or housing 12. This housing 12 is rigidly secured at 13 between the spaced rear ends of the chassis frame 14, and, together with this frame, forms the main fore and aft chassis and support assembly of the tractor. The power unit or engine 15 may be of any suitable size and type, and includes the propeller shaft 16 which extends rearwardly and into the housing 12 where it drives the axle 11 through the directly meshed pinion and gear 17 and 18. The power unit 15 is enclosed by a suitable hood 19 and may have the radiator 20 for the usual cooling purposes.

The frontal end of the assembly is supported by the dirigible front wheel 21 journaled by its axle 22, at the lower end of a supporting foot, bracket, or fork member 23. The foot is connected to a vertically extended shaft 24 journaled by bearings 25 in the front end portion of the frame 14, and this shaft carries a worm gear 26 with which is meshed a steering worm or pinion 27, disposed within the cylindrical housing 28. A steering rod 29 is journaled by bearings 30 along one side of the frame 14 and at its frontal end is connected to the worm 27, while at its rear end it is connected, by the universal joint 31, to a steering column 32 which is supported by a bracket 33 in a rearwardly and upwardly inclined position. A steering wheel 34 is secured atop the column 32 and permits the rotation of the worm 27 to oscillate the gear 26 and correspondingly move the wheel 21 on a vertical axis for steering the tractor.

A mounting flange or plate 35 is formed, or rigidly secured, at the lower end of the shaft 24 and the upper end of the wheel mounting foot 23 is formed with a horizontally extended and laterally turned end portion 36 adapted to rest flatly beneath the mounting plate, as shown. The said end portion 36 has spaced bolt openings 37—37a adapted to register with tapped openings 38—38a in the plate 35, and cap screws 39—39a may be inserted upwardly into these openings and turned tight in order to rigidly secure the front wheel mounting assembly to the steering assembly. The end portion 36 of the mounting foot also has the additional laterally spaced openings 40—40a through which the cap screws 39—39a may be introduced (instead of the openings 37—37a) to thus vary the lateral position of the wheel assembly relative to the vertical axis of the shaft 24.

A rear supporting or side wheel 41 is provided, and the same is carried in laterally spaced position relative to the ground wheel 10 by means of an outrigger, boom, or arm, designated generally at 42. The side wheel 41 may either be arranged in transverse alignment with the traction wheel 10, as shown, or it may be spaced forwardly or rearwardly therefrom, if so desired. This outrigger 42 extends laterally and comprises the tubular member 43 which is telescopically mounted over an elongated hanger shaft 44 extended horizontally and laterally from the gear housing 12, and which is rigidly supported by its flanged end 45 bolted at 46 to said housing. The outer end of the tubular member 43 is turned downwardly at right angles to form a supporting foot 47, into the open lower end of which is telescopically inserted the shaft 48 having a rigid flange or collar 49 bearing upwardly against the end of the foot. This shaft 48 is turned at right angles at 50, and forms the spindle or axle 51 for the side or supporting wheel 41.

Inner and outer fastening bolts 52 and 53 are extended diametrically through the tubular member 43 and shaft 44 near the inner and outer end portions, respectively, and serve to lock these parts together. However, the member 43 is provided with a series of equally spaced and diametrically aligned apertures 54 and 54a adjacent each bolt and, by removing the bolts 52 and 53 and inserting them through any aligned and corresponding pair of these apertures, and of course through the openings in the shaft 44, the member 43 may be secured in any one of several different adjusted positions laterally along the shaft. In this manner then, the relative lateral spacing between the side wheel 41 and the traction wheel 10 may be varied at will.

A seat bracket or arm 55 is mounted at its lower end under the inner fastening bolt 52 and extends rearwardly and upwardly to support the seat 56, affixed to its upper end, in a position convenient to the steering wheel 34. The outer fastening bolt 53 also supports the outer end of a diagonal brace bar 57 which extends inwardly and forwardly to the frame 14, where it is fastened by the screw 58. This brace bar relieves the outrigger assembly of rearward and horizontal strains, as will be understood. It will be noted that the adjustment of the outrigger member 43 laterally, to vary the wheel spacing, has no effect whatever on the positions of the seat 56 and brace bar 57, for the reason that the bolts 52 and 53 maintain their same relative spacings and positions at all times.

Fastening bolts 59 are also extended diametrically through openings 60 in the foot portion 47 of the outrigger, and the shaft 48 therein, and serve to maintain the wheel 41 in vertically adjusted position. The wheel may thus be locked in position to roll straight ahead exactly parallel with the traction wheel 10. Where the wheel 41 is located out of alignment with the traction wheel 10, it may be arranged to caster on shaft 48 when making a turn.

The tractor is operated in usual manner but it will be evident that extreme flexibility is provided by the various wheel adjustments, thus making the tractor suitable for many uses where a larger model, especially where provided with fixed wheel spacing, would be wholly unsatisfactory. The assembly is, furthermore, simplified and the weight and size considerably reduced, due to the fact that no differential gears are employed, and differential action, is of course unnecessary since the drive connection is made only to the single traction wheel 10.

The possible adjustments of the front and side wheels are many. For example, either wheel may be adjusted to any of several lateral positions (by removal and replacement of the various fastening screws and bolts 39—39a and 52—53) entirely independently of each other or in corresponding steps as the particular use of the tractor may require. The range of lateral adjustment of the side wheel 41 is further amplified by the fact that it may be "flopped over," or the shaft 48 rotated through 180 degrees to increase or decrease the spacing by twice the amount of the offset from the shaft, and then secured in this position by the bolts 59.

The steering action of the tractor is facilitated and the wear on the front wheel tire may be reduced by the provision of a front wheel bracket or fork of the type shown in Figs. 9 and 10. This bracket, designated at 23a, is adjustably mounted by screws through its end 36a to the plate 35a carried by the shaft 24a to turn therewith in steering, but the bracket is curved forwardly and downwardly toward its lower end to thus carry the wheel 21a forwardly of the vertical steering axis. As a result, when making a turn for instance to the right, the wheel 21a is thrown forwardly and outwardly of the fore and aft axis of the tractor and any tendency of the wheel to "dig in" the ground is prevented. The contact with the ground is further distributed more evenly across the tread of the tire when making the turn, and uneven tire wear and wear due to pressure against the side walls of the tire is accordingly prevented to a large extent. The same effects obtain in making a turn to the left.

In some cases it may be found desirable to locate the front wheel in alignment with the rear traction wheel 10 of the tractor, and this may be readily accomplished by lengthening the end 36 of the front wheel bracket the necessary amount, or by extending the entire tractor chassis 14 at an angle to the straight-ahead travel leading forwardly and to the right in order to bring its frontal end directly ahead of the traction wheel. A preferable arrangement, however, would be to build out the frontal end of the tractor on the right hand side so that the steering shaft 24 and associated parts might be supported in alignment with the traction wheel. These modifications are thought to be obvious as regards mechanical construction, so that illustration is unnecessary, and, of course, such variations are considered to be within the scope of the present invention.

The greater part of the weight of the tractor is hung inwardly of the traction wheel 10, and is thus effective to prevent any possible lateral tipping or overbalancing action while in use.

In connection with this "tipping" of the tractor, it will be apparent that the use of a single side wheel mounted and arranged as herein disclosed makes possible the very convenient transverse adjustment of the tractor during side hill plowing. As shown in Figs. 11 and 12, the outrigger assembly may be reversed by rigidly mounting the tubular member 43a to the tractor and swiveling the shaft 44a for axial rotation therein. The side wheel 41a may be mounted by the shaft 48a in a socket in the lower front portion 47a in the manner hereinbefore described, and the transverse adjustments of the side wheel may be carried out with this assembly, also in the manner described. However, the shaft 44a may be allowed to rotate on its horizontal axis to thus swing the foot 47a in a vertical, fore, and aft plane, and accordingly vary the height at which the side wheel is carried. Thus the wheel may be raised (Fig. 12) when running at the uphill side of the tractor to lower the upper side of the tractor and prevent it from possibly tipping over to the downhill side. For convenience in thus operating the side wheel, the shaft 44a may carry a hand lever 61 having a releasable pawl 62 for engaging a toothed quadrant 63 secured to the outer end of the tubular member 43a to thus lock the shaft in any selected position.

The lever 61 may be secured by a bolt 64 at any position along the shaft 44a according to its adjusted position transversely of the tractor, and the shaft may be locked in transverse adjustment, while still being free to rotate, by means of a cap screw (or screws) 65 engaging peripheral grooves 66 in the shaft.

The assembly of the members 43a and 44a shown in Figs. 11 and 12 may be preferable to that heretofore described, also for the reason that the brace 57 and seat bracket 55 may be more rigidly connected, or even welded, to the tubular member 44a, since this member is itself rigidly mounted.

The operator's seat 56 and the steering wheel 34 are located to one side of the main body of the tractor, as shown, and thus the operator is permitted a clear view of the path ahead at all times. This advantageous arrangement is made possible by the fact that the wheel 41, being relatively small, presents no obstruction to the seat and steering wheel as would be the case were this wheel as large as the traction wheel 10. The fact that only one large wheel is necessary further reduces initial cost and upkeep of the tractor, since only a single large and expensive tire is needed.

It is understood that modifications may be made in the structure as disclosed, provided such modifications come within the spirit and scope of the appended claims. Having now therefore fully illustrated and described our invention, what we claim to be new and desire to protect by Letters Patent is:

1. A tractor comprising a frame, a traction wheel at the rear of the frame, a dirigible front wheel at the frontal portion of the frame, an outrigger arm extended transversely and substantially horizontally from the frame, a wheel supporting member having a journaled connection with the outer end of the arm for movement thereon about a generally upright axis, the lower end of the said member being turned horizontally to form a wheel mounting spindle, a side wheel journaled on the spindle, and means for locking the member in adjusted positions about its upright axis to locate the spindle in inwardly or outwardly turned positions and for adjusting the transverse spacing of the side wheel with respect to the frame.

2. A tractor comprising a frame, a traction wheel at the rear of the frame, a dirigible front wheel at the frontal portion of the frame, an outrigger arm extended transversely and substantially horizontally from the frame, a wheel supporting member having a journaled connection with the outer end of the arm for movement thereon about a generally upright axis, the lower end of the said member being turned horizontally to form a wheel mounting spindle, a side wheel journaled on the spindle, and means for locking the member in adjusted positions about its upright axis to locate the spindle in inwardly or outwardly turned positions and for adjusting the transverse spacing of the side wheel with respect to the frame, the diameter of the side wheel being less than the vertical clearance between the outrigger arm and the ground whereby the said wheel, in its innermost adjusted position, may operate below the arm.

3. A tractor comprising a frame, a relatively large power operated traction wheel mounted alongside a rear portion of the frame, a dirigible front wheel assembly at the forward part of the frame, an arm member extended transversely from the frame at the side opposite the traction wheel, a wheel supporting member having a journaled connection with the outer end of the arm for swiveling movement about a substantially upright axis, a side wheel journaled on the said supporting member for supporting engagement with the ground, and a brace member extended between the frame and arm member and connected to the arm member inwardly and clear of the journaled connection of the wheel supporting member with said arm member.

VICTOR N. ALBERTSON.
JOHN HENNINGSEN.